No. 621,017.  
F. BELLET.  
TRANSMISSION DEVICE.  
(Application filed Aug. 9, 1897.)  
Patented Mar. 14, 1899.
(No Model.)
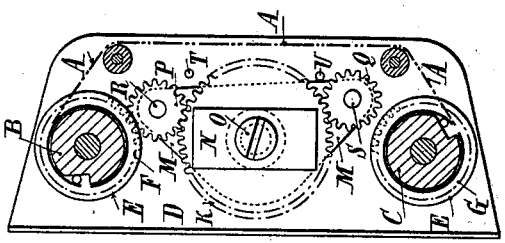
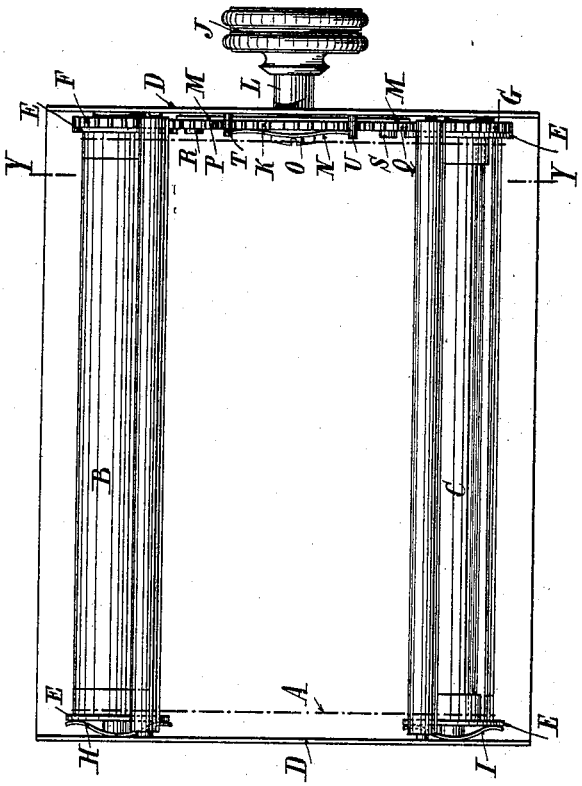

UNITED STATES PATENT OFFICE.

FERDINAND BELLET, OF PARIS, FRANCE.

TRANSMISSION DEVICE.

SPECIFICATION forming part of Letters Patent No. 621,017, dated March 14, 1899.

Application filed August 9, 1897. Serial No. 647,552. (No model.)

*To all whom it may concern:*

Be it known that I, FERDINAND BELLET, a citizen of the Republic of France, residing at Paris, France, have invented a certain new and useful Improved Transmission Device, of which the following is a specification.

This invention relates to a new device for transmitting movement by means of oscillating toothed wheels and is applicable generally to all apparatus in which a film band or ribbon is to be moved or wound up in one or the other direction—such, for instance, as roller devices for photographic, stereoscopic, or panoramic apparatus, stereoscopes, grapho-scopes, magic lanterns, projecting-lanterns, registering apparatus, type-writers, and for similar purposes.

In the accompanying drawings the device according to the present invention is shown by way of example as applied to a roller-frame, Figure 1 showing a roller-frame in front elevation and Fig. 2 in vertical cross-section on the line Y Y of Fig. 1.

The band A, which it may be desired to move alternately in one or in the other direction, according to the wish of the operator, may be a paper band, a photographic film, or any other flexible sheet which is capable of being rolled up. Said band A in the example shown in the drawings is capable of being alternately wound up on two rollers B and C, which are rotatable on their parallel spindles supported in a framing D. The rollers B C, of wood, metal, or any other suitable material, may be provided at each of their ends with a circular flange E, serving to guide the rolling up of the band A.

Each roller B C carries at one of its extremities a toothed wheel F G, which when rotated causes its corresponding roller to rotate. The other ends of said rollers B C are preferably acted upon by small spring-blades H I, pressing against the framing D and serving to produce sufficient friction to prevent the rollers from rotating except when they are rotated by the operator.

On the side of the framing D on which are supported the ends of the rollers B C, carrying the toothed wheels F G, is arranged the mechanism according to the present invention, enabling the operator to actuate one or other of the rollers B C as desired by simply turning a central milled knob J or handle in one or in the other direction. The mechanism consists chiefly of a main toothed wheel K, mounted on a spindle L, which carries a milled head or handle J. Upon the spindle L, between the wheel K and the corresponding inner face of the framing D, is arranged so as to be capable of oscillating on said spindle a plate M. A spring-blade N, bearing upon the wheel K, and a screw-head O on the inner end of the spindle tends to keep the plate M and wheel K in close contact, so as to produce sufficient friction between them to cause the plate M to participate in the movement of wheel K when the latter is caused to rotate by turning the knob J and its spindle L.

The plate M carries two small toothed wheels P Q, rotating about fixed spindles R and S, secured to the plate. These two wheels are arranged to be in constant engagement with the main wheel K and so that when the plate M is brought into a certain position one of its wheels P or Q engages simultaneously with the main gear K and with its corresponding wheel F or G on one of the rollers B or C, the other wheel engaging only with the main wheel K, but being out of engagement with its corresponding wheel F or G on the other roller. The plate M being turned in the opposite direction of the toothed wheel P or Q which was engaged with its corresponding wheel F or G on the roller will become disengaged from it, while remaining always in engagement with the main wheel K, while the other wheel, also still in engagement with the main wheel K, is caused to engage with the corresponding wheel F or G on the other roller with which it had been previously out of engagement. In the first case the movement communicated to the milled head J is transmitted by the main toothed wheel K to that roller which is connected to it by the corresponding toothed wheels, and in the second case the other roller is driven.

The movement of the plate M, carrying the toothed wheel P or Q, is preferably limited by two stops T U, arranged in the desired position on the framing D and regulating the movement of said plate M, so that the engagement of the toothed wheels mentioned takes place under the most favorable conditions.

It will be understood from the preceding that by turning the milled head J in one direction the plate M will be caused to move in the same direction owing to the friction between the main wheel K and said plate produced by the spring N, and consequently the movement of the main wheel will be transmitted to the roller desired by the engagement of one of the toothed wheels P or Q on the pivoted plate with the toothed wheel of the corresponding roller B or C. By turning the milled knob J in the opposite direction the plate M is caused to turn in that direction, the result of which will of course be the disengagement of the roller previously driven and the engagement of the toothed wheel P or Q corresponding to the other roller, to which its rotary motion will be thus transmitted. Either of the rollers B and C may be thus driven according to requirement or wish by turning the milled knob J in one or in the other direction, and as owing to the arrangement described and illustrated the movements of the rollers take place in opposite directions the result will be that it will be possible to wind the band around one or other of the rollers, as desired, the roller on which the band is being wound up being driven, while the other, from which the band is being unwound, is out of driving contact.

I claim—

1. In a device of the character described, the combination with a main supporting-frame, of rollers rotatably carried thereby, a toothed wheel mounted on one end of each of said rollers, a spindle rotatably mounted in the frame intermediate the rollers, a main toothed wheel mounted on said spindle, a plate oscillatably mounted on the spindle and held in frictional contact with the main toothed wheel whereby said plate may be partially turned or oscillated in one or the other direction when the spindle and the main toothed wheel are correspondingly turned as described, and toothed wheels carried by the plate and gearing with the main wheel and adapted to engage with one or the other of the toothed wheels on the rollers when the plate is oscillated in one or the other direction, for the purposes specified.

2. In a device of the character described, the combination with a main supporting-frame, of rollers rotatably carried thereby, a toothed wheel mounted on one end of each of said rollers, a spindle rotatably mounted in the frame intermediate the rollers, a main toothed wheel mounted on said spindle, a plate oscillatably mounted on the spindle between the main wheel and the side of the frame, a spring bearing against the main toothed wheel to hold the latter and the plate in frictional contact whereby said plate may be partially turned or oscillated in one or the other direction when the spindle and the main wheel are correspondingly turned, as described, and toothed wheels carried by the plate and gearing with the main wheel and adapted to engage with one or the other of the toothed wheels on the rollers when the plate is oscillated in one or the other direction, for the purposes specified.

In testimony whereof I have hereto set my hand in the presence of the two subscribing witnesses.

FERDINAND BELLET.

Witnesses:
LOUIS SULLIGER,
EDWARD P. MACLEAN.